INVENTORS
HARVEY E. KRONICK
CHARLES E. NEWCOMB
SIDNEY SINGER
BY Joseph J. Connerton
ATTORNEY May 5, 1970 H. E. KRONICK ET AL 3,510,866

REVERSE SCANNING SYSTEM

Filed May 27, 1966 3 Sheets-Sheet 2

United States Patent Office 3,510,866

Patented May 5, 1970

3,510,866

REVERSE SCANNING SYSTEM

Harvey E. Kronick, Kingston, Charles E. Newcomb, Woodstock, and Sidney Singer, Poughkeepsie, N.Y., assignors to International Business Machines Corporation, Armonk, N.Y., a corporation of New York Filed May 27, 1966, Ser. No. 553,494
Int. Cl. G09f 9/00
U.S. Cl. 340—324 7 Claims

ABSTRACT OF THE DISCLOSURE

A display system includes one or more cathode ray tubes in which characters are generated in a vertical scanning sequence from video data stored on a delay line buffer. The delay line buffer format includes video data for a second cathode ray tube display stored in the columnar space between characters, and binary coded character data stored adjacent to its associated video in the normally blank space between characters. When the first character or column of characters has been generated by a series of vertical scans, the beam is positioned to begin the next character sequence.

Figures 1, 3:
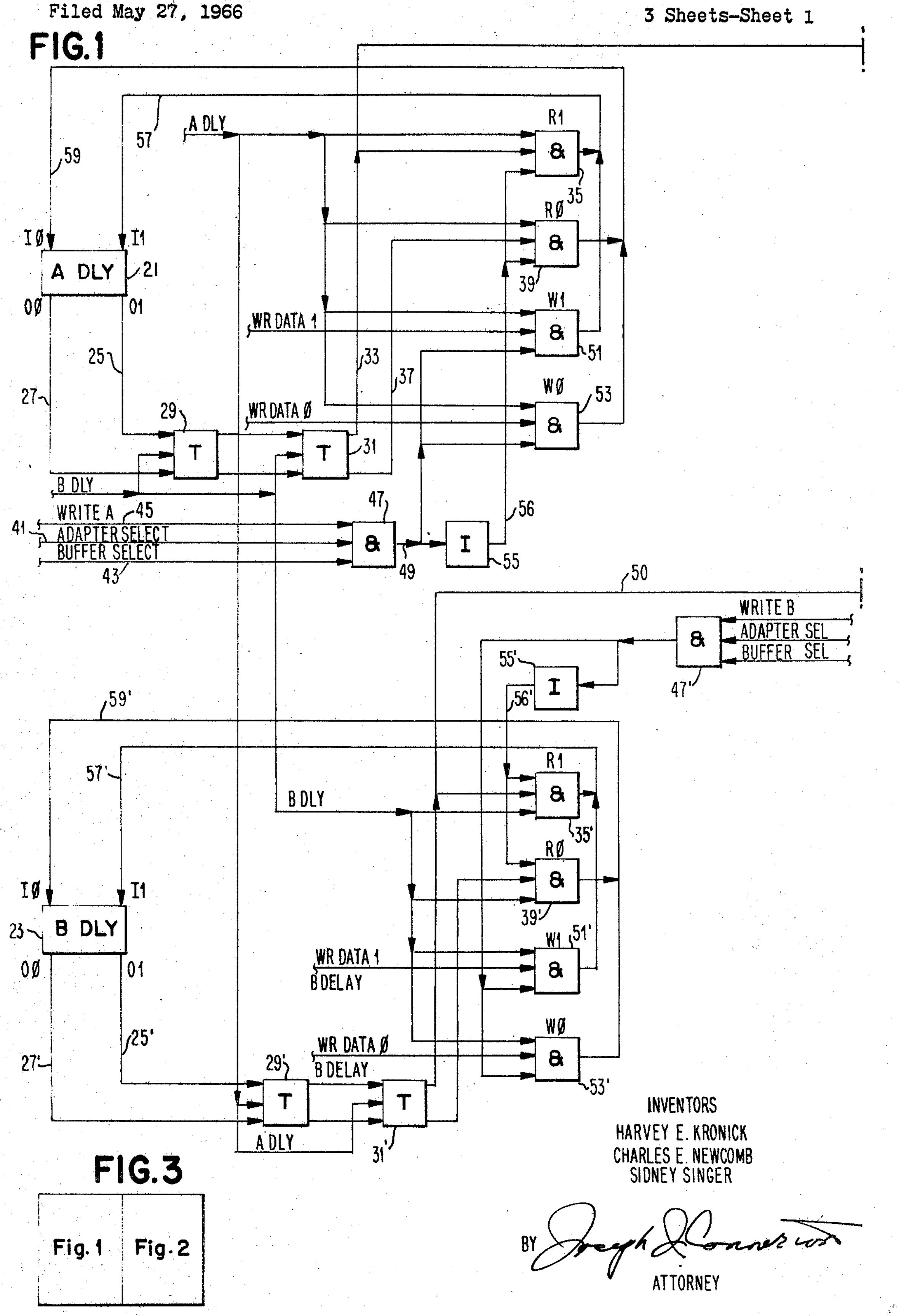

The present invention relates to display systems and more particularly to a display system for generating a plurality of character segments during a vertical scan of a cathode ray tube.

In certain data processing systems, a cathode ray display is used in applications that require man-machine communications to provide real time access to computer information in visual form. The ability of such display devices to reproduce computer data on a screen much faster than that produced by ordinary terminal print out makes it an exceptional graphic solution for a wide range of industrial, scientific and commercial applications. To improve the feasibility of such devices from the standpoint of cost, it is desirable to have a common control apparatus adapted to service a number of such displays with provision for storage and display of different messages as required. Such display systems may be operated in real time, in which video signals from a character generator are applied directly to control the deflection of a cathode ray tube, or the terminal apparatus may incorporate buffer storage mediums where the video signals identifying selected symbols are stored for subsequent display and reintensification. The present invention will be described with reference to the latter system using a recirculating delay line buffer for servicing a pair of displays, the symbols being generated in segment form during a full line vertical scan of a cathode ray tube from video signals stored in the delay line.

In terminal display apparatus of the type described above, various apparatus limitations and timing considerations must be carefully weighed to enable the terminal equipment to function effectively as part of an overall system. In a display system utilizing video signals stored in a circulating delay line buffer, the characters could be composed using a horizontal or vertical raster scan. An example of the horizontal raster system is shown in copending application Ser. No. 512,106 (IBM Docket 7934) "Improved Display System," filed by John L. Botjer et al. on Dec. 7, 1965.

Assuming the characters are formed on a 5 x 7 matrix of seven horizontal lines using horizontal scanning, the beam would be required to sweep through the entire screen before the adjacent character in the same row could be composed and displayed. However, with respect to individual displays, by utilizing vertical scanning, at the end of displaying one character, the sweep will be positioned to start display of the adjacent character in the row. Such an arrangement is considerably more efficient in message composing when the data transmission rate from the computer is considered. With respect to simultaneously servicing two displays, vertical scanning allows use of the space between rows on one display to store and display video information relating to the corresponding row of the other display. Efficient utilization of the delay line is further improved by positioning the BCD information in reference to its associated video, in the column employed for spacing between characters.

The remaining divergent problems related to cathode ray tube terminal display systems but not necessarily to each other include the decay time of the CRT phosphor which in turn is a function of the repetition rate of the system, the recirculating rate of the buffer, the data rate from the associated data processor, and the speed of the character generator. All of these factors must be interrelated in such a way that a flicker-free display is provided without unduly limiting the capabilities or the data transfer rate from the computer. While recirculating delay line buffers have certain advantages such as modularity for varying character capacities, one of the problems encountered with respect to delay line storage is that of obtaining sufficient band width for the video signals, i.e., higher repetition rate without undue complexity and the resultant higher cost. In order to match the band width capabilities of the delay line with the data rate of the associated data processor, two delay lines are logically OR'ed together to form a single delay line designated a logical delay line, but are offset from each other by a period corresponding to half the normal bit period of the timing lines in an interleaving technique which effectively increases the operating frequency by a factor of two. This technique is more fully shown and described in copending application Ser. No. 487,887, now U.S. Pat. 3,413,615, "Improved Delay Line Buffer Storage Circuit," filed by John L. Botjer et al. on Sept. 16, 1965. In the ensuing description, a logical control system, designated an adapter, is used for loading and generating a display from a pair of delay lines interleaved in the manner described above, together with common control and timing circuitry. Each adapter controls two displays, and each display is capable of displaying six lines of 40 characters or a total of 240 characters. The information which may be transmitted from a computer or generated by the associated terminal keyboard includes binary coded data (BCD) signals which identify the specific character together with five 7-bit video signals which identify the video components of the associated character.

In accordance with the present invention, there is provided an improved terminal display system utilizing a full line vertical scanning medium which displays characters which are related on the delay line buffer in a unique format. The BCD information is stored in the delay line in a location which comprises the normal blank space between characters, while the characters are sequentially generated as a plurality of segments during five vertical scans. In the interest of clarity, the vertical components of each scan will be designated as a stroke, although it will be appreciated that these strokes are in fact composed of a plurality of dots. Two cathode ray displays designated as Odd and Even derive their video signals and their associated BCD information from a common buffer storage medium. A logical control system defines the manner and sequence in which the information is loaded and read from the delay line buffer in order to generate the two displays. On each display, the space between character rows corresponds to the size of each character such that the characters on the Even display are composed on its CRT during the blank interval between rows of characters on the associated Odd display and vice versa, and seven bits of information are selectively displayed on one cathode ray tube during the normal blank period of the second. Thus, on the logical delay line the information is interleaved so that seven adjacent bits definitive of one stroke for the Odd display are followed by seven bits definitive of the corresponding stroke for the Even display and so forth. In the preferred embodiment of the invention herein described, the vertical sweep is the high speed sweep, while the horizontal sweep is the low speed sweep, contrasted to the conventional TV type raster display. Six vertical lines, BCD and video $V_1$–$V_5$ are required per character or column of characters.

Accordingly, a primary object of the present invention is to provide an improved display device.

Another object of the present invention is to provide an improved low cost terminal display system.

Another object of the present invention is to provide an improved display device in which a plurality of character segments are generated during a full line vertical sweep of a CRT.

Still another object of the present invention is to provide an improved display system utilizing a unique format of recirculating delay lines for servicing two or more displays.

A further object of the present invention is to provide an improved control system for loading and unloading of a delay line buffer to service two cathode ray displays capable of displaying different messages.

The foregoing and other objects, features and advantages of the invention will be apparent from the following more particular description of a preferred embodiment of the invention as illustrated in the accompanying drawings.

Figure 2:
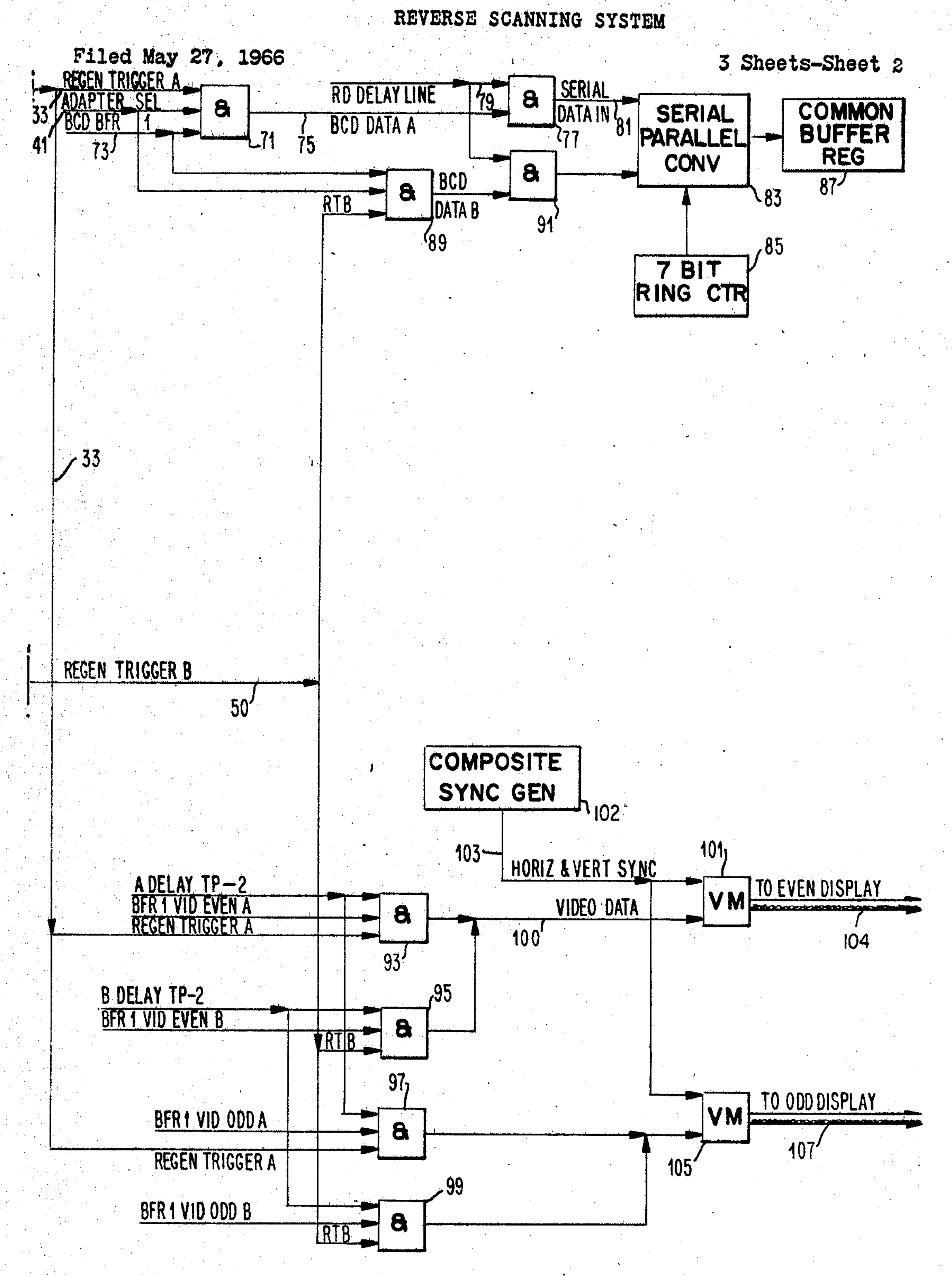

In the drawings:

FIGS. 1 and 2 interconnected as shown in FIG. 3 illustrate in logical block form a preferred embodiment of the present invention.

Figure 4:
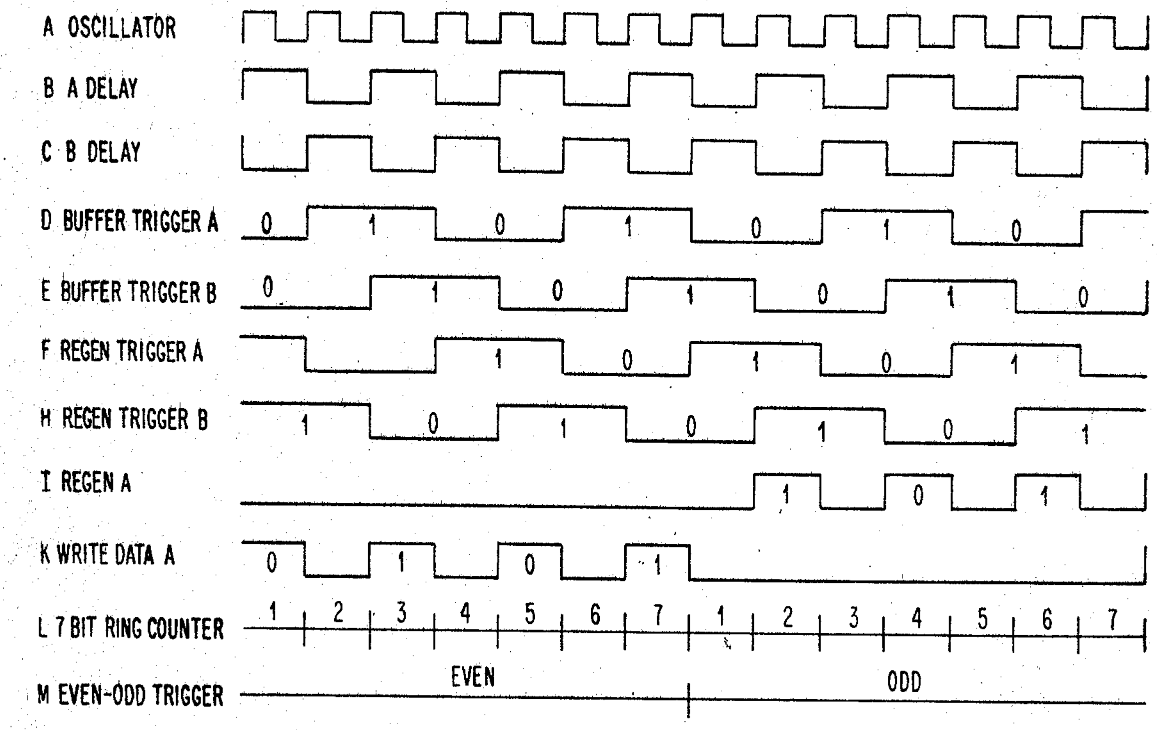

FIG. 4 is a timing diagram related to various components and signals of FIGS. 1 and 2.

FIGS. *5a* and *5b* illustrate the interrelationship between the Odd and Even displays with respect to vertical scanning and character positioning.

Before proceeding with a decription of the instant invention, the delay line format employed in the preferred embodiment will be briefly described. The present invention is described in terms of delay line adapters, each such adapter including one or more pairs of delay line buffers interleaved as described and associated control circuitry. While the display system with which the invention is associated may operate with 1, 2 or 4 buffers to provide a pair of displays of 240, 480 or 960 characters, respectively, the invention is described in terms of a single adapter to provide two displays of 240 characters, 6 rows of 40 characters each. Delay line storage segments are designated slots, one slot representing the amount of storage space required for 12 seven-bit signals which constitute one column or vertical sweep of six characters for the Odd and Even display. Six slots stored in the delay line constitutes a coded representation of up to 12 complete characters for two displays, a BCD column and the associated five video columns comprising the characters. The BCD information immediately precedes the video information which it identifies, and is stored in bit positions 2–7 in the logical delay line. Associated with one and only one of the BCD words for each display is a control signal designated TIC, a single bit which is used as an index to the data stored in the delay lines of the display adapter. Thus each adapter contains two TIC's, one for the Odd display and one for the Even display. Storage of digitized information in a delay line is dynamic rather than static, and the stored information must be continuously regenerated when bits reach the end of the delay line. Two delay lines designated A and B interconnected as described are used as storage units, each such pair of delay lines is designated a buffer, and each buffer in turn contains the storage facilities for displaying up to 240 characters on the CRT of two display stations. Throughout the description of the logic circuitry of FIGS. 1 and 2, reference will be made to the timing diagram of FIG. 4 to illustrate the timing relationship between the various circuits. In the ensuing description, it is arbitrarily assumed unless noted otherwise that the logical circuits illustrated in FIGS. 1 and 2 employ positive logic, i.e., the logical circuits are operated by positive signals and are deactivated by negative signals.

Before referring to the drawings, a brief description of the timing and control circuitry will serve to clarify the logical drawings of FIGS. 1 and 2. A conventional crystal controlled square wave oscillator provides the basic timing pulses for the system which, in the preferred embodiment, may operate at a frequency of approximately 4.0 megacycles as shown in FIG. 4A, and also generates the two basic timing pulses TP–1 and TP–2. The output from the oscillator is connected to a high speed frequency divider, which subdivides the oscillator frequency into pulses having a 2-megacycle frequency designated the A delay pulse and the B delay pulse. While various frequency dividers are known in the art, in its simplest embodiment, the A and B delay pulses could be produced by a binary trigger which is complemented by the oscillator. The A and B delay pulses are employed as read-write timing signals for entering data in or extracting data from the delay line buffers as well as gating BCD and video signals within the buffer. The A delay and B delay pulses are also used to gate the TP–2 pulse to generate the A delay TP–2 or B delay TP–2 timing pulses. Since these represent conventional timing circuits, highly developed in the art, the details relating thereto have been omitted from the drawings in the interest of clarity. However, the A and B delay pulses are shown in FIGS. 4B and 4C, and their control lines have been labeled appropriately. Each character on the delay line is identified by five 7-bit video signals, and a seven-bit ring counter is employed to step off the bits of the character. It is stepped from 1 to 7 during the Even display time and likewise from 1 to 7 during the Odd display time. The outputs of the bit ring counter are used in bursts of 7 to write and read delay lines 21 and 23 of the display adapter. Connected to the carry output of the 7-bit ring counter is a trigger, the Even/Odd trigger, which is complemented by the carry signal each time the bit ring read counter reaches a count of 7. The outputs of that trigger are used to establish time intervals for operating with either the Even or the Odd display, both of which are serviced by the display adapter. The timing of the Even/Odd trigger is shown in FIG. 4M.

Referring now to FIG. 1, there is illustrated the control circuitry for writing in and reading from delay lines 21, 23. The A delay-B delay trigger, not shown but described above, is initially arbitrarily set in the A condition to establish a reference timing pulse and ensure generation of the A delay pulse before the B delay pulse when operation is initiated. As previously indicated, the A and B delay pulses are approximately 250 nonoseconds in length and 180° out of phase with each other. The binary 1 and binary 0 inputs of delay lines 21 and 23, labeled I1 and I*θ*, are connected to corresponding regeneration gates more fully described hereinafter. The binary 1 and binary 0 outputs from delay line 21, labeled O1 and O*θ*, are connected via lines 25 and 27 to corresponding inputs to a buffer trigger 29. Buffer trigger 29 is a gated trigger circuit which operates on a transition signal applied to a third input to transfer the significant level at the input, i.e., 1 or 0, to the output. The read out of A delay line 21 is controlled by the B delay pulse, which comprises the transition signal applied as the third input to buffer trigger 29. The outputs from buffer trigger 29 are connected to corresponding inptus of a regeneration trigger 31, which is also controlled by the B delay pulse to transfer its input signals to the output of the trigger. The output from either buffer trigger 29 or regeneration 31 will be a single signficant level representing a binary 1 or 0. The corresponding waveforms for the buffer trigger A and regeneration trigger A for an alternate series of 0's and 1's are shown in FIGS. 4D and 4F, while the corresponding outputs for the buffer and regeneration trigger B are shown in FIGS. 4E and 4H. Thus two B delay pulse periods are required to transfer the information from the buffer trigger 29 input to the output of regeneration trigger 31, both transfer operations requiring a total of 1 microsecond. The binary 1 output from output of regeneration trigger 31 is applied via line 33 to a regeneration gate 35, which comprises a three input logical AND circuit, while the binary 0 output from regeneration trigger 31 is connected via line 37 to a corresponding regeneration gate 39. Regeneration is the normal operation of the adapters except during reading or writing operations, and only one delay line signal is regenerated at any given time.

As previously described, the environmental display system contemplated by the present invention is capable of utilizing a plurality of display adapters, each adapter in turn controlling two or more displays or portions thereof. In addition, a plurality of buffers are contemplated, since each adapter requires an associated buffer of two delay lines. Thus, selection lines are provided for adapter and buffer selection in the logical arrangement of FIG. 1, although in the single adapter embodiment herein described, such selection is unnecessary. Assuming that the appropriate adapter select and buffer position select lines 41 and 43, respectively, have been energized and that a write opeartion is specified, the write A line 45 is brought up at the correct bit time to write data, thereby completing the inputs to logical AND circuit 47. When the three input conditions are met, the resultant output on line 49 from logical AND circiut 47 conditions the write 1 and wirte 0 data gates 51 and 53. At the same time the signal on line 49 is inverted by inverter 55 to provide an output on line 56 to decondition the regeneration gates 35 and 39.

Referring briefly to FIG. 4, waveform K shows the signal pattern for writing 0101, while the corresponding regeneration signal is shown in waveform I. Since only write or regeneration can occur at any given time, during regeneration of the pattern shown in waveform I, the write gates 51 and 53 would be deselected by the inverted output from logical AND circuit 47 on line 49. The regeneration B and write data B lines, not shown in the timing diagram, correspond to but are skewed 250 microseconds, one bit time, from their A counterparts shown in FIG. 4I and 4K. The outputs from the write gates 51 and 53 are connected through lines 57, 59 respectively to the associated inputs of A delay line 21. When the appropriate binary 1 or 0 data signal has been written into the A delay as above described, the write A input 45 to logical AND circuit 47 will drop, thereby deconditioning the logical AND circiut and the resultant output on line 49 will decondition the write gates 51, 53, while the inverted output from inverter 55 will condition the regeneration gates 35 and 39, respectively. The outputs from either the regeneration gates 35, 39 or the write gates 51, 53 are applied via lines 57 and 59 as the 1 and 0 inputs to A delay line 21. Thus in writing into the delay line, the information content is determined by the regeneration trigger 31 or the write data gates 51 and 53, while the duration of the input signal is controlled by the A delay pulse. Reference is made to FIG. 4I for the waveforms representing a series of alternates 1's and 0's developed by regeneration gatets 35 and 39, while FIG. 4K shows the waveforms for a corresponding series of alternate 1's and 0's which are recorded via write gates 51 and 53 in the delay line. Since write and regeneration cannot occur at the same time, as shown in FIGS. 4I and 4K, one of the lines 49 or 56 will be down while the other is recording. The read and write control circuitry for the B delay line is substantially identical to that of the A delay line described above, and corresponding elements are identified by a prime subscript. The main distinction in the B control is that the functions of the A and B control pulses are reversed relative to their operation in the A control. The sequence of operations in both loading and unloading the logical delay line requires that adjacent bits, both BCD and video, are alternated between the A and B delay line. Thus, for example, in a specific BCD pattern of 101010 for the Odd display, the three 1's would be recorded in delay line A for example, the three 0's in delay line B. In video information using seven bits, four bits would be recorded in one delay line, three in the other. By way of example, in the preferred embodiment herein described, four bits from the A delay line and three bits from the B delay line have been arbitrarily selected for the Even display while three bits from the A delay line and four bits from the B delay line are employed with the Odd display.

In a read operation, where data is requested by the processor from the terminal display, the only relevant information on the delay line is the BCD data, since the video signals have no significance other than regenerating the display. The BCD information is read from the delay line and transmitted in serial sequence to a serial to parallel converter, from where it will be transferred to a common buffer register. The BCD data A signals are read as follows. Referring to FIG. 2, the output 33 from regeneration trigger 31 is also applied to logical AND circuit 71. The remaining inputs to logical AND circuit 71 are the adapter select line 41 and the BCD Buffer 1 line 73. The BCD Buffer 1 line is a control signal which originates at the beginning of BCD time and is of sufficient duration to permit reading the 12 BCD words. The adapter select line is conditioned when the TIC control signal associated with a BCD word previously described is detected. While the TIC detection sequence is not considered essential for an understanding of the present invention, it is shown and described in application Ser. No. 816,167, a continuation of copending application Ser. No. 553,467, "Keyboard Selection System," filed by Edward S. Olsen and Robert W. Love, May 27, 1966, now abandoned. The resultant output on line 75, representing the BCD data A information is applied as one input to logical AND circuit 77. The second input to logical AND circuit 77 on line 79 is a read delay line signal which may originate, for example, from a computer command. This signal is timed to read in only the selected BCD data. The resultant signal on line 81, labeled Serial Data In, is applied to a serial to parallel converter 83, which in turn is controlled by a seven bit ring counter 85 used to gate the BCD data in serial form into a common buffer register 87. The data B BCD signals are similarly connected to logical AND circuit 89, which utilizes the same adapter select line and BCD Buffer 1 line used by the BCD data A, the third input to logical AND 89 being the regeneration trigger B input from line 50. The resultant BCD data B output from logical AND circuit 89 is applied to logical AND circuit 91, which is also sampled by the read delay command on line 79 to provide the B delay line BCD data into the serial to parallel converter 83 and thence to the common buffer register 87. The operation of the serial to parallel converter is more fully shown and described in copending application Ser. No. 496,096, "Character Code Translator," filed by Robert W. Love on Oct. 14, 1965.

The final operation to be described relates to that for generating the Odd and Even display from the video information stored on the delay line. To generate data for the Even and Odd displays from inputs provided by the A and B delay lines, four logical AND circuits 93, 95, 97 and 99 are employed. In the illustrated embodiment of FIG. 2, logical AND circuits 93 and 95 provide video data for the Even display, logical AND circuits 97 and 99 for the Odd display. The regeneration trigger A line 33 is one of the conditioning signals applied to logical AND circuits 93 and 97, while the regeneration trigger B signal on line 50 is applied to condition logical AND circuits 95 and 99. The remaining inputs to logical AND circuit 93 are the A delay TP–2 timing pulses previously described, which is also applied to logical AND circuit 97, and the buffer 1 video Even A signal, a control signal which determines the duration of the video sample. As previously noted, the Even A delay line is sampled for four video signals, while the Odd A delay line is sampled for three. The A delay TP–2 pulse samples logical AND circuits 93 and 97, while the B delay TP–2 timing pulse samples logical AND circuits 95 and 99. In response to the three input conditions described above, logical AND circuit 93 provides a video output on line 100 to a video mixer 101, where it is mixed with a composite sync signal comprising horizontal and vertical synchronizing signals from composite sync generator 102. In the illustrated embodiment, the vertical sync represents the high speed sync, the horizontal sync the low speed. The resultant composite video data is applied via a coax cable 104 to the Even display. A display system which responds to video signals combined with composite sync signals is shown in copending application Ser. No. 538,653, now U.S. Pat. 3,423,749, "Character Positioning Control," filed by Charles E. Newcomb on Mar. 30, 1966. Since logical AND circuits 93 and 95 are alternately sampled by the A delay TP–2 and the B delay TP–2 pulses, alternate signals are applied to the video mixer 101. After 7 video signals are applied to the Even display, a similar sequence of 7 video signals is provided for the Odd display by logical AND's 97 and 99 similarly sampled by the A and B Delay TP–2 pulses. The video mixer 105 is serviced by logical AND circuits 97 and 99, logical AND circuit 97 having inputs from the buffer 1 Video Odd A, regeneration trigger A and the A delay TP–2 timing pulses, while logical AND circuit 99 has the buffer 1 Video Odd B combined with the regeneration trigger B and B delay TP–2 timing pulse. The resultant outputs on line 107 represent a sequence of alternate video signals, which are suitably synchronized to provide composite video signals to the Odd display.

Figure 5A:
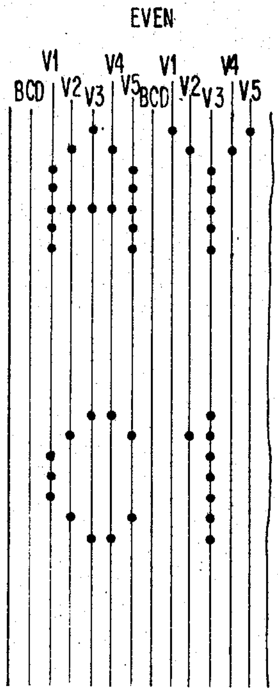
Figure 5B:
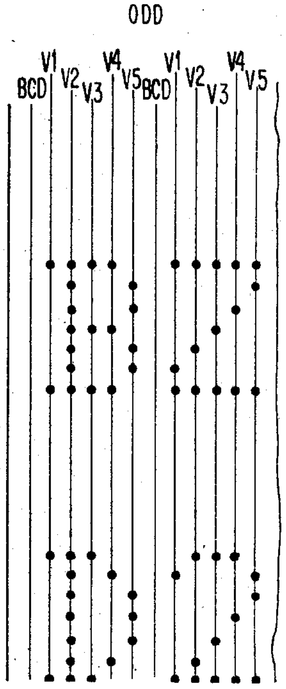

Referring now to FIGS. 5*a* and 5*b*, there is illustrated in enlarged form a representation of four characters on each of two displays generated by a video scanning operation on the manner previously described. FIG. 5*a* illustrates the Even display, while FIG. 5*b* shows the corresponding Odd display for four characters. The drawings illustrate the manner in which the Odd display is interlaced during the normal blank interval between rows of characters in the Even display. For example, the character in the Odd display, B is generated during the normal blank interval of the Even display between characters A and C, and so forth. With respect to the individual displays, other character displays could be shifted upward or downward in conventional fashion using the normal vertical positioning adjustment conventional to TV receivers. Thus, in practice, the relative positioning of the rows in an actual display could be identical.

While the invention has been particularly shown and described with reference to a preferred embodiment thereof, it will be understood by those skilled in the art that various changes in form and details may be made therein without departing from the spirit and scope of the invention.

What is claimed is:

1. A system for generating characters as a plurality of segments generated during a series of vertical scans comprising first and second cathode ray display means, each including beam intensity control means, a source of video signals comprising a first data sequence for said first cathode ray display means interleaved with a second data sequence for said second cathode ray display means, said first and second data sequence defining character segments for said first and second cathode ray display means, and control means responsive to said source of video signals for alternately applying said data sequences to said first and second beam intensity control means to produce visual indicia comprising vertically disposed segments corresponding to said video signals on said first and second cathode ray tubes.

2. Apparatus of the type claimed in claim 1 wherein said source of video signals comprises a recirculating delay line buffer.

3. Apparatus of the type claimed in claim 2 wherein said delay line buffer is alternately loaded from two signal sources whereby the space between corresponding segments of characters in successive rows in said first cathode ray display is utilized to store positionally related data for said second cathode ray display.

4. Apparatus of the type claimed in claim 3 wherein said control means for alternately applying video signals to said first and second intensity control means comprises means for unloading said delay line in a sequence corresponding to the loading sequence.

5. In a display system, the combination comprising a first display device comprising a cathode ray tube having beam deflection and intensity control means, a source of video data representative of characters to be displayed, said source of video data comprising a storage device, means for deflecting the beam of said cathode ray tube in a vertical raster scan sweep pattern, and means for applying the video data from said storage device to said intensity control means in synchronism with said vertical deflection means whereby said video signals control the unblanking of said beam to generate said characters as a sequence of segments during a plurality of vertical sweeps, said beam following completion of said character being positioned to generate the next character in the row or rows being displayed, said storage device having a format including video signals for a second display device time interleaved in the normal space between said character segments of said first display device.

6. A display system of the type claimed in claim 5 wherein said delay line storage format includes binary coded data representative of the characters stored immediately adjacent to the video representation in the normally blank space between characters.

7. Apparatus of the type claimed in claim 6 further including control means for alternately applying the video signals from said delay line storage in sequence to said first and second display device.

References Cited

UNITED STATES PATENTS

| | | | |
|---|---|---|---|
| 3,046,331 | 7/1962 | Gebel | 178—5.6 |
| 3,289,196 | 11/1966 | Hull | 340—324 |
| 3,305,841 | 2/1967 | Schwartz | 340—324 |
| 3,307,156 | 2/1967 | Durr | 340—324 |
| 3,116,436 | 12/1963 | Sweeney. | |
| 3,382,487 | 5/1968 | Sharon et al. | 340—324.1 |
| 3,389,404 | 6/1968 | Koster | 340—324.1 |

JOHN W. CALDWELL, Primary Examiner

M. M. CURTIS, Assistant Examiner

U.S. Cl. X.R.

315—22; 340—154